United States Patent
Chitkara et al.

(10) Patent No.: US 11,558,373 B2
(45) Date of Patent: Jan. 17, 2023

(54) GRADUAL PASSWORD ROLLOVER

(71) Applicant: Oracle International Corporation, Redwood Shores, CA (US)

(72) Inventors: Rajnish Chitkara, Fremont, CA (US); Peter Knaggs, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 17/109,097

(22) Filed: Dec. 1, 2020

(65) Prior Publication Data
US 2022/0174061 A1    Jun. 2, 2022

(51) Int. Cl.
*H04L 29/00* (2006.01)
*H04L 9/40* (2022.01)

(52) U.S. Cl.
CPC ........ *H04L 63/0846* (2013.01); *H04L 63/102* (2013.01); *H04L 63/108* (2013.01); *H04L 63/20* (2013.01)

(58) Field of Classification Search
CPC ............... H04L 63/0846; H04L 63/102; H04L 63/108; H04L 63/20
USPC .......................................................... 726/6
See application file for complete search history.

(56) References Cited

U.S. PATENT DOCUMENTS 10,554,630 B2 * 2/2020 Chen ..................... H04L 9/3226
2020/0329025 A1 * 10/2020 Kahn .................... H04L 9/3226

* cited by examiner

*Primary Examiner* — Jeffrey C Pwu
*Assistant Examiner* — Michael D Anderson
(74) *Attorney, Agent, or Firm* — Trellis IP Law Group, PC; Lisa Benado

(57) ABSTRACT

A rollover system is provided to facilitate transitioning of client devices in a shared account network environment, from an old password to a new replacement password. The switching of passwords may take place gradually during a rollout period for client devices without required downtime and reducing a risk of lockouts. During the rollover period, a prior salt is temporarily carried over to a new verifier for the replacement password. Two new verifiers are generated: a temporary new verifier using the old salt for verification during the rollover period and another new verifier using a different new salt for verification after the rollover period had expired. During the rollover period, authentication involves the use of the temporary new verifier with the old salt or by the old verifier and old salt of the prior password. After the rollover period, authentication is based on the new verifier with a new salt.

20 Claims, 9 Drawing Sheets

400

Account A

| Client Device 402 | Active Verifier 404 | Status 406 | Rollover Period Value 408 | Audit Event 410 | User Context 412 |
|---|---|---|---|---|---|
| CD1 | | | | | |
| CD2 | | | | | |
| CD3 | | | | | |

FIG. 4

GRADUAL PASSWORD ROLLOVER

BACKGROUND

In some computing environments, multiple clients may use a same account and same credentials to connect to a server. Authentication by entering of passwords is used to establish the identity of the users of an account. The passwords are secret strings of characters known only to the users of a system and by the system. Passwords may be salted before it is hashed by adding a unique, random string of characters known only to the system.

Security best practices include periodic changing of user passwords and salts to safeguard against cyberattacks, e.g. using rainbow tables, of the password and salt. Rotating a shared user password often involves a period of time in which clients are unable to access the account, such as a scheduled application downtime or a pre-scheduled maintenance window.

Any client failure in entering passwords can cause all clients of an account to be locked out. Typically, as soon as a user password is changed, all clients that connect to the server using the account must immediately start using the new password for any new connections. Continued use of old passwords by even a single client installation can often lock the application user account after a small number of failed connections. Once locked, all client installations (applications, scripts, etc.) that use the account are unable to make any new connections. This can cause an application outage and require a system administrator to intervene for corrective action.

SUMMARY

The present rollover system facilitates password transitioning by client devices in a shared account network environment. Various embodiments described provide effective gradual switching over of passwords for client devices without required downtime and reducing a risk of lockouts. During a rollover period to a new replacement password, a client device can gain access to a protected resource by one of two ways: using an old password that is hashed with an old salt or using the new replacement password that is also hashed with the old salt. Rather than strictly dedicating a salt to a particular verifier of a password, the present system temporarily carries over the old salt from an old verifier of an old password to reuse with a temporary verifier for a new password during the transition time. After the transition period, another verifier is applied that is based on a new salt for the new password. The verifiers using the old salts are phased out. By temporarily reusing the old salt with a new verifier, the transition may occur with minimum extra resources, such as extra calculations or protocol configurations.

An apparatus is provided for transitioning passwords of a user account accessible to a plurality of client devices. The apparatus includes one or more processors and logic encoded in one or more non-transitory media for execution by the one or more processor. When the logic is executed, the processors are operable to perform operations. Such operations include activating a rollover period in response to receiving a second password to replace a first password associated with a stored first verifier created with a first salt (v1s1). In response to receiving the second password, a second verifier created with a second salt (v2s2). In addition, a second verifier created with the first salt (v2s1) is generated. The first salt is continued from prior use with the first verifier associated with the first password. An entered password is authenticated by meeting certain verifier criteria. During the rollover period, the verification criteria includes that the entered password satisfies one of verifiers (v2s1) or (v1s1). After the rollover period expires, verifier criteria includes that the entered password satisfies verifier (v2s2).

In some implementations, the operations further include storing in an authentication storage, verifiers (v2s2) and (v2s1) as active verifiers corresponding to the second password. After rollover period expires, verifiers, (v1s1) and (v2s1), may be removed from the authentication storage.

The second password may be received from an administrator device. In some implementations, the rollover period corresponds with a non-zero value in a user profile for the user account. At times, the rollover period may be overridden, for example, after the administrator device propagates the second password to the plurality of client devices. In some implementations, prior to verifying the entered password during the rollover period a lock status of the user account may be received and the lock status may be continued for a specific lock period of time. Also, during the rollover period, the rollover period may be manually extended by a particular amount of time in response to receiving an extension request. Such extension may be made by the authentication system, by changing a profile parameter specifying a time for the rollover period.

In some implementations a computer-implemented method may be provided for transitioning passwords of a user account accessible to a plurality of client devices to access a database server. The method may include activating a rollover period in response to receiving a second password to replace a first password associated with a stored first verifier created with a first salt (v1s1). Furthermore, in response to receiving the second password, verifiers may be generated including a second verifier created with a second salt (v2s2) and a second verifier created with the first salt (v2s1). The first salt is continued from prior use with the first verifier associated with the first password. The method includes authenticating of an entered password if the entered password meets one verification criteria. The verification criteria during the rollover period includes the entered password satisfying one of verifiers (v2s1) or (v1s1). After the rollover period expires, verification criteria includes the entered password satisfying verifier (v2s2).

The verifiers (v2s2) and (v2s1), may be stored in an authentication storage as active verifiers corresponding to the second password. After rollover period expires, the verifiers, (v1s1) and (v2s1) may be removed from or otherwise marked as deactivated in the authentication storage.

In some implementations the method may include overriding the rollover period after an administrator device propagates the second password to the plurality of client devices. Also, prior to verifying the entered password during the rollover period, the method may include receiving a lock status of the user account. The lock status may be continued for a lock period of time. An unlock status of the user account may be received after the lock period of time. The rollover period may be maintained during the lock status and unlock status. The method may further include during the rollover period, extending the rollover period by a particular amount of time in response to receiving an extension request, by changing a profile parameter specifying a time for the rollover period.

A non-transitory computer-readable storage medium may be provided that carries program instructions thereon. The, when executed by one or more processors, cause the one or more processors to perform operations. Such operations include activating a rollover period in response to receiving a first replacement password to replace a first password associated with a stored first verifier created with a first salt (v1s1). In response to receiving the first replacement password, the operations generate a second verifier created with a second salt (v2s2) and a second verifier created with the first salt (v2s1). The first salt is continued from prior use with the first verifier associated with the first password. During the rollover period, the operations include receiving a second replacement password and removing verifiers (v2s1) and (v2s2) for the first replacement password. A third verifier created with a third salt (v3s3) and a third verifier created with a first salt (v3s1) are generated. The first salt is also continued from prior use with the first verifier associated with the first password. The operations include authenticating an entered password by the entered password meeting one verification criteria of: during the rollover period, the entered password satisfying verifiers (v3s1) or (v1s1), or after the rollover period expires, the entered password satisfying verifier (v3s3).

The operations of the storage medium may also include storing in an authentication storage, v3s3 and v3s1 as active verifiers corresponding to the second password. After rollover period expires, the operations may include removing verifier (v1s1) and (v3s1) from the authentication storage.

The second replacement password may be received from an administrator device. The rollover period may correspond with a non-zero value in a user profile for the user account. After the administrator device propagates the second replacement password to the plurality of client devices, the rollover period may be overridden by the operations. Prior to verifying the entered password during the rollover period, the operations may include receiving a lock status of the user account, in which the lock status may be continued for a lock period of time. An unlock status of the user account after the lock period of time may be received. The rollover period may be maintained during the lock status and unlock status.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

FIGS. 2a, 2b, and 2c are sequence diagrams illustrating processes for gradually rolling over a password using a rollover period, in which FIG. 2a shows submission of a replacement password, FIG. 2b shows login verification during the rollover period, and FIG. 2c shows login verification after the rollover period, in accordance with some implementations.

FIG. 4 is a schematic diagram of example dictionary storage table used for authentication related information of an account, in accordance with some implementations.

DETAILED DESCRIPTION OF EMBODIMENTS

Figure 1:
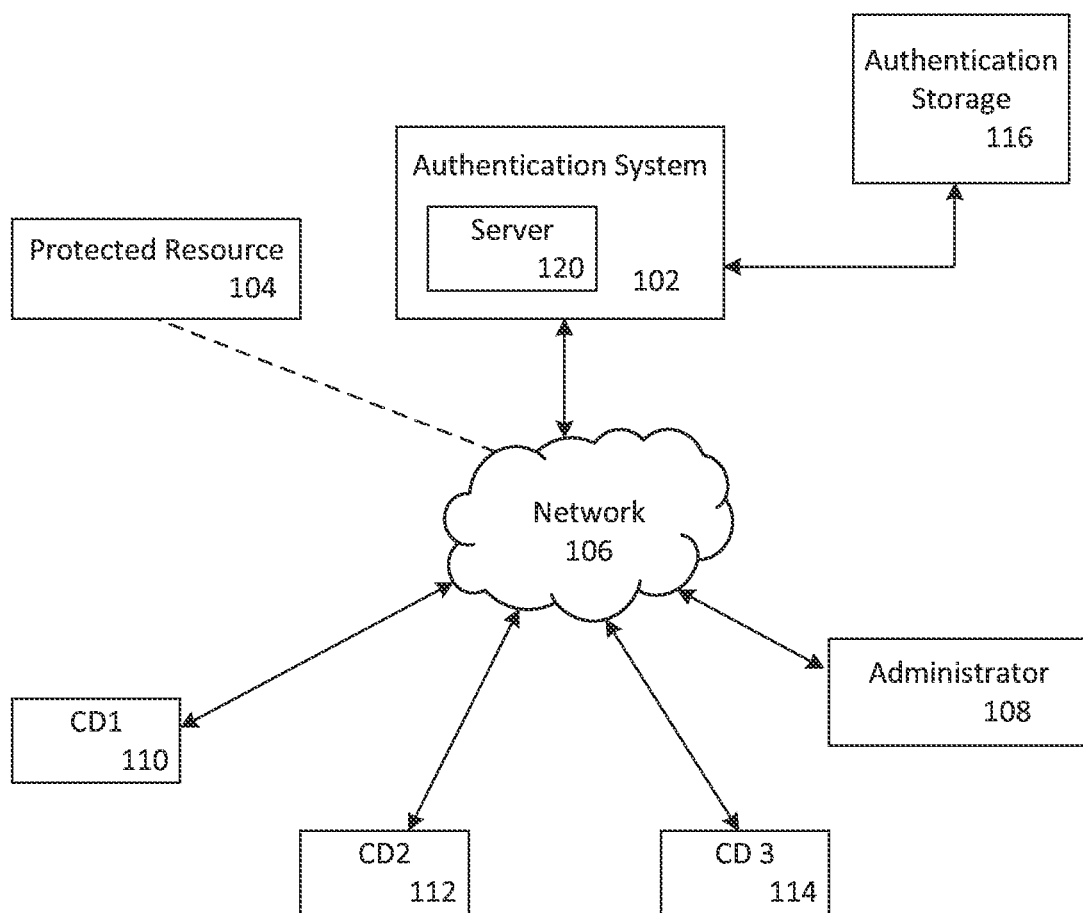
FIG. 1 is a conceptual diagram illustrating an example environment in which various aspects of a gradual password rollover can be implemented, in accordance with some implementations.

The present rollover system enables client devices using a shared account to securely connect to a protected resource via passwords and salts that are periodically updated. Passwords may be replaced for various purposes, such as regularly scheduled password changes. Client devices logon using a password hashed with a salt. The salt is added to the password before hashing to create a verifier.

Typically with password protection, a salt by its random nature is different for every new password created for every user. The present rollover system differs in that an old salt (also referred to as "prior salt" or "first salt") used in hashing a prior password is reused in hashing a temporary verifier for a replacement password. The temporary verifier that uses the old salt for this new password is only active during a predesignated period of time, called a "rollover period." As described in detail below, relying on a single (old) salt during the rollover period greatly simplifies the processing for both the client and server sides and enables current systems to employ the rollover process without changes to protocol, client software or drivers. During the rollover period, an old password is phased out and a new replacement password is gradually propagated to all clients without requiring application downtime. The rollover period also allows for a smooth transition from the old salt to a new salt.

To change the password, a replacement password triggers initiation of the rollover period. During the rollover period, the prior salt is temporarily carried over to a new verifier for the replacement password. Two new verifiers are generated by the rollover system and stored. The two new verifiers are: (1) a temporary new verifier using the old salt for verification during the rollover period, and (2) a new verifier using a different new salt for verification after the rollover period had expired. During the rollover period, verification of a client device requesting access may be provided by the client device entering the temporary new verifier with the old salt or by entering the old verifier and old salt of the prior password. After the rollover period, client devices sends the new verifier with the different new salt for authentication.

The rollover system uses a salted challenge response protocol for authentication. The salt is a string of characters or bits that varies from user to user and is mixed with a new password before applying a one-way hash function. The salt is randomly generated when the account is created and when the password is changed. The inclusion of the salt makes it more challenging for an intruder to perform dictionary or brute force attacks on the verifier of a password in an attempt to recover the account password. The salt adds more complexity and computation requirements for an intruder. Attacks against one verifier with a salt cannot be used against another verifier with a different salt. Since repeating of the old salt for the new password verifier is temporary during the rollover period, it provides a simple transition for the system without compromising protection.

Two new verifiers are generated by the rollover system at the onset of the rollover period, a second verifier created with the first salt (v2s1) and the second verifier create with a new second salt (v2s2). The first salt (s1) is the same salt previously used in creating a verifier for the prior password.

The generation of verifier v2s1 in which the old salt is used, is significant for allowing the authentication system to easily implement the password rollover feature described herein. The repeat use of the old salt (s1) for the temporary verifier (v2s1) enables the system to implement the rollover feature without burdensome changes to the protocol. Continuing to use the old salt (s1) when generating the verifier (v2s1) that corresponds to the new password, enables the rollover system to implement the rollover feature without requiring changes to the client-side software or complicated changes to the protocol.

The verifiers (v2s2) and (v2s1) may be stored as the active verifiers to be used in authentications during the rollover period. When a password is entered by a client device attempting to gain full access to a protected resource during the rollover period, the verifiers (v2s2) and (v1s1) (from the prior old password) are used in the authentication process. After the rollover period, a client device must enter the verifier with the new salt (v2s2), in order to successfully fully access the protected resource.

For the purposes of this description, a networked computing environment may be any computing environment that includes intercommunicating computers, i.e., a computer network. Similarly, a networked software application may be computer code that is adapted to facilitate communications with or otherwise use of one or more computing resources, e.g., servers, via a network. Similarly, a networked software application may be any software application (e.g., a mobile app, desktop browser plugin, etc.) that communicates with one or more computing resources via a computer network. For example, a shared environment may be provided involving multiple actors, e.g. client devices (also referred to as "users") associated with software applications, authentication server(s), authentication storage unit(s), and secured resources, e.g. one or more databases.

For the purposes of the present discussion, an enterprise may be any organization of persons, such as a business, academic institution, government, military, and so on. The terms "organization" and "enterprise" are employed interchangeably herein.

An account includes multiple client devices that access a protected resource, e.g. a software product for storing and retrieving data, via client software applications running on the client devices. Client devices may refer to computing devices that are non-human users.

The present rollover system is beneficial for accounts that logon frequently and create multiple sessions from multiple source IP addresses. Abrupt passwords changes can lead to password entry failures by a client device and locking of the account for all client devices.

It is desirable to implement the present password rollover process in existing password systems without requiring significant changes to the existing systems. Changes to protocols typically require a change to the client drivers and may require client devices drivers as well as server drivers for the protected resource to be upgraded. Such substantially changes may severely prolong the adoption cycle for the feature.

The password rollover processes described herein may be conveniently added as a feature to existing password systems without required changes to the authentication protocol or needing the client software to be upgraded to newer versions. The rollover features may be seamlessly backported to old versions of protocols. The present rollover solution works with supported client drivers without updating the drivers. For example, if a system would challenge a client device with two salts, an old and a new salt, such as an old salt to generate the old verifier for the old password and a second new salt to generate a new verifier of the replacement password, the client device may need to perform two sets of calculations, one with each of the two salts, and send back two responses. The server may also need to attempt to authenticate the client using the two responses. This two salt transition process may be complex, processor intensive and require a change in protocol. Instead, the present password rollover process includes a single salt with a challenge to the client device during the rollover period. During the period, the client need only perform a single calculation using the old salt for either the old password (if the replacement password had not yet been received) or replacement password (if the replacement password has already been propagated to that client device).

The present rollover system, with the repeated use of an old salt with a new verifier during a transition period, provides simplicity in its transition to new salts. By comparison, systems that rotate passwords using salts that correspond with unique password identifiers associated with client devices, may require both client devices and system servers to maintain a history of password identifiers. Such use of password identifiers to access salts requires complicated syncing of all client devices and changing of authentication protocols to add the feature to existing password systems.

The present rollover system further provides for use of one salt at a time so that the old salt is used during the rollover period and a new salt after the rollover period. This switching of salt avoids complication that may be presenting if using two salts, e.g. old salt and new salt, at the same time during a transition period. In using two salts would require clients to perform two sets of calculations and send back two sets of responses. The authentication server also would need to attempt to authenticate using both responses, resulting in extra use of computing resources and changes to existing protocols.

FIG. 1 is a block diagram showing a distributed environment 100 that includes an exemplary authentication system 102 for managing password protection of access to a protected resource 104. An example of distributed environment 100 is a mid-tier architecture for providing applications through the Internet. Other architectures are also possible for using the present rollover system.

A plurality of client devices CD1 110, CD2 112, and CD3 114 seek to use the protected resource 104 after receiving authorization by the authentication system 102. The authentication system 102 may include one or more servers that calculate a password verifier for new user accounts and for replacement passwords when an existing password is changed. The communications between devices of the distributed environment 100 may be encrypted with one or more session keys, e.g. a first part session key fragment and second part session key fragment, as described below with regards to FIG. 2b.

The distributed environment 100 may be any collection of computing resources of an organization used to perform one or more tasks involving computer processing. An example distributed environment includes various computing resources distributed across a network 106 and may further include private and shared content on Intranet Web servers, databases, files on local hard discs or file servers, email systems, document management systems, portals, and so on. The distributed environment 100 includes an enterprise that with client devices 110, 112, and 114 and may represent a cloud environment, private or public cloud, on-premises environment, or combinations thereof. In distributed environment 100 that is cloud-based, the authentication system 102, authentication storage 162, and/or protected resource 104 are located outside of the enterprise. An enterprise in a cloud distributed environment 100 may connect with the authentication system 102 and protected resource via a cloud. In some implementations, the distributed environment 100 may be an on-premises environment, e.g. client devices may connect with servers behind a firewall of the client.

Client devices 110, 112, and 114 may be any computer, software application, or system that is adapted to receive content from a server or another computing device, software application, or system. The client devices run a client application that interfaces with the protected resource 116. The terms "client," "client application," and "client software application," may be employed interchangeably herein when referring to software that issues one or more request messages that are addressed to another computing resource, called the server-side application herein. The term "client device" as used herein refers to the computer hardware and accompanying client software application(s) running thereon or therein. Client devices: include one or more client application that seek to retrieve context from the protected resource. Any number of client devices may be included in the distributed environment 100. In one example use case, the client devices may represent a community of web applications connecting to a database (protected resource 104). The client devices send to the authentication system 102 access requests to interface with the protected resource 104 in a session through network 106.

An administrator device 108 may refer to a combination of hardware and software, and may include a collection of one or more computing devices, e.g. servers. The administrator device runs an administrator application that interfaces with the client devices, e.g. deploy replacement passwords, and with the authentication system, e.g. submit replacement passwords. Typically, the administrator device propagates replacement passwords to all client devices of the distributed environment 100, whether the client device is active or inactive. In some implementations, the administrative device 108 is a client device of an administrative user who is granted administrative privileges.

The administrator device 108 is employed by an administrative user who has account management privileges to set up passwords and rotates passwords when needed. The administrator device 108 propagates the passwords to the client devices of the distributed environment 100. Often the administrator device 108 performs acts under an administrator user responsible for the organization, integrity, and management of enterprise data that may be housed on protected resource 104. For example, an administrative user of the administrator device 108 may assist in defining, creating, maintaining, backing up, and securing a databases of the enterprise. The administrator device 108 ensures that authenticated client devices have access to the data they need, when they need it. The administrative user and administrator device 108 are trusted by the enterprise with the preservation of the password-based authentication system.

In some implementations, the password rollover feature is not applied to the administrator device. Such exemption to password rollover may take place no matter whether password rollover feature is enabled in an administrative user profile. For example, the administrative device may not generate verifiers when a password has been changed. In this manner, administrative accounts that are copied to a password file need not be updated and synced with authentication storage tables when changing passwords.

The authentication system 102 verifies client devices and provides for access control of the protected resource 104. The authentication system 102 may refer to a combination of hardware and software, and may include a collection of one or more servers. The authentication system sends the appropriate salts, e.g. in a challenge response, to the client devices in response to the client devices requesting access to the protected resource 104.

The authentication system 102 can include one or multiple authentication servers 120 for processing access requests from the client devices 110, 112, and 114. The authentication server 120 may be one or more physical servers and/or virtual servers.

The authentication system 102 accesses authorization data stored in authorization storage 116. The authentication storage 116 provides a tracking of active verifiers to maintain which verifiers (for a prior password or new replacement password) using which salts (old salt or new salt) should be applied for the authentication system 102 to determine if a client device submitted the correct verifier (for the correct password) to gain access to the protected resource 104. The listing of active verifiers in the authorization storage is updated during the rollover period and after the rollover period (e.g. after the first logon after the rollover period expires) to ensure that the appropriate verifier is applied.

In some implementations, the authorization storage 116 may be a component of the authentication system 102. The authorization storage 116 may also be an external storage unit and data transfer or communication may take place via a network, e.g. network 105. The data may be stored in one or more tables, e.g. data dictionaries, described in further detail with regard to FIG. 4. The data may be modified with every password change, client device attempt to gain authorization, etc.

The authentication storage 116 may be configured to meet storage requirements for the three verifiers. If more than one verification protocol is implemented on the various client devices of the distributed environment 100, and each version of the password verifier would be stored. For example, storage requirement may include 3×62 (one for each of the three verifiers) bytes for a particular protocol version and 3×162 bytes (one for each of the three verifiers) for another protocol version. Additional storage may be needed such as 5 bytes for semicolons separating each of the verifiers and 4 bytes for identification of which verifier uses which salt.

Protected resource may include items, e.g. data stored in one or more databases stored, which the client devices seek to access. The protected resource may enable read-only or read-write access by respective client devices. The protected resource may include files (such as documents, spreadsheets, and images), computational resources (such as processing power, cloud storage, and network communication bandwidth), software applications, etc. The protected resource may be stored in any number of locations, such as a server, a data repository, data center, on a cloud server, or on-premises storage unit. For example, the protected resource 104 may be a relational database for running online transaction processing, data management, analytics, data warehousing and various other workloads for the enterprise. For the purpose of this description "protected resource" may refer to the storage location and/or data stored and accessible by client devices.

One or more networks 106 may be used by the client devices 110, 112, and 114 to interface with computing resources. The network 106 may include one or more WANs (Wide-Area Networks) and/or LANs (Local-Area Networks), which may be wired and/or wireless. In some examples, the network 106 may include one or more cellular networks and/or the Internet, among other networks. In some examples, a local network such as a Bluetooth™ network is employed for communication between the various computing resources of the distributed environment 100. Although the network 106 is shown as a single network, it should be understood that the network 106 may include multiple, distinct networks that are themselves communicatively linked. The network 106 could take other forms as well.

The network 106 may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, and other communication protocols.

Figure 2A:
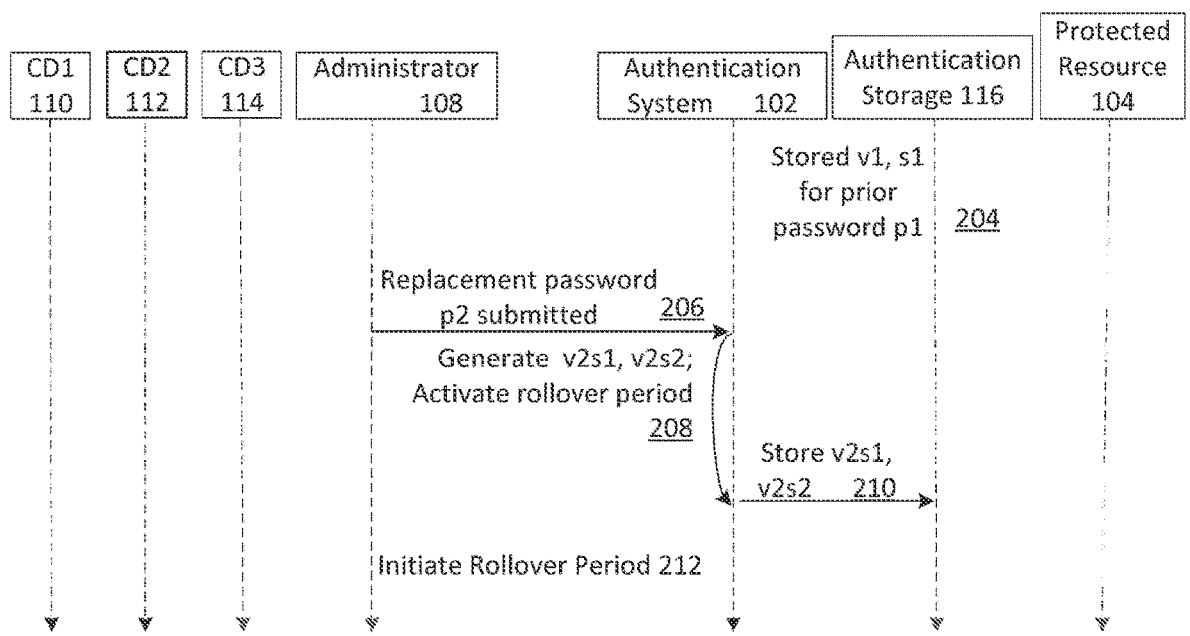
Figure 2B:
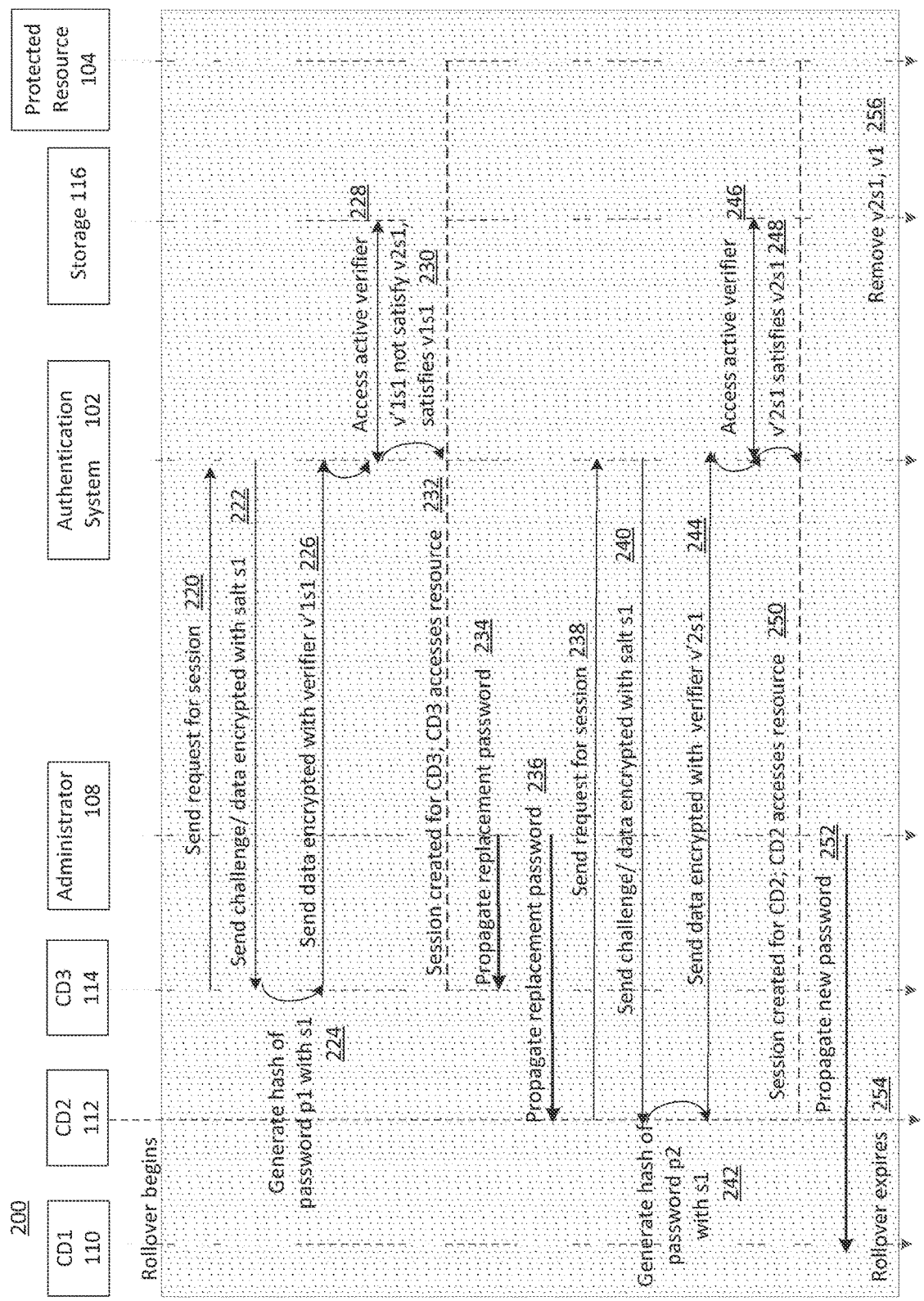
Figure 2C:
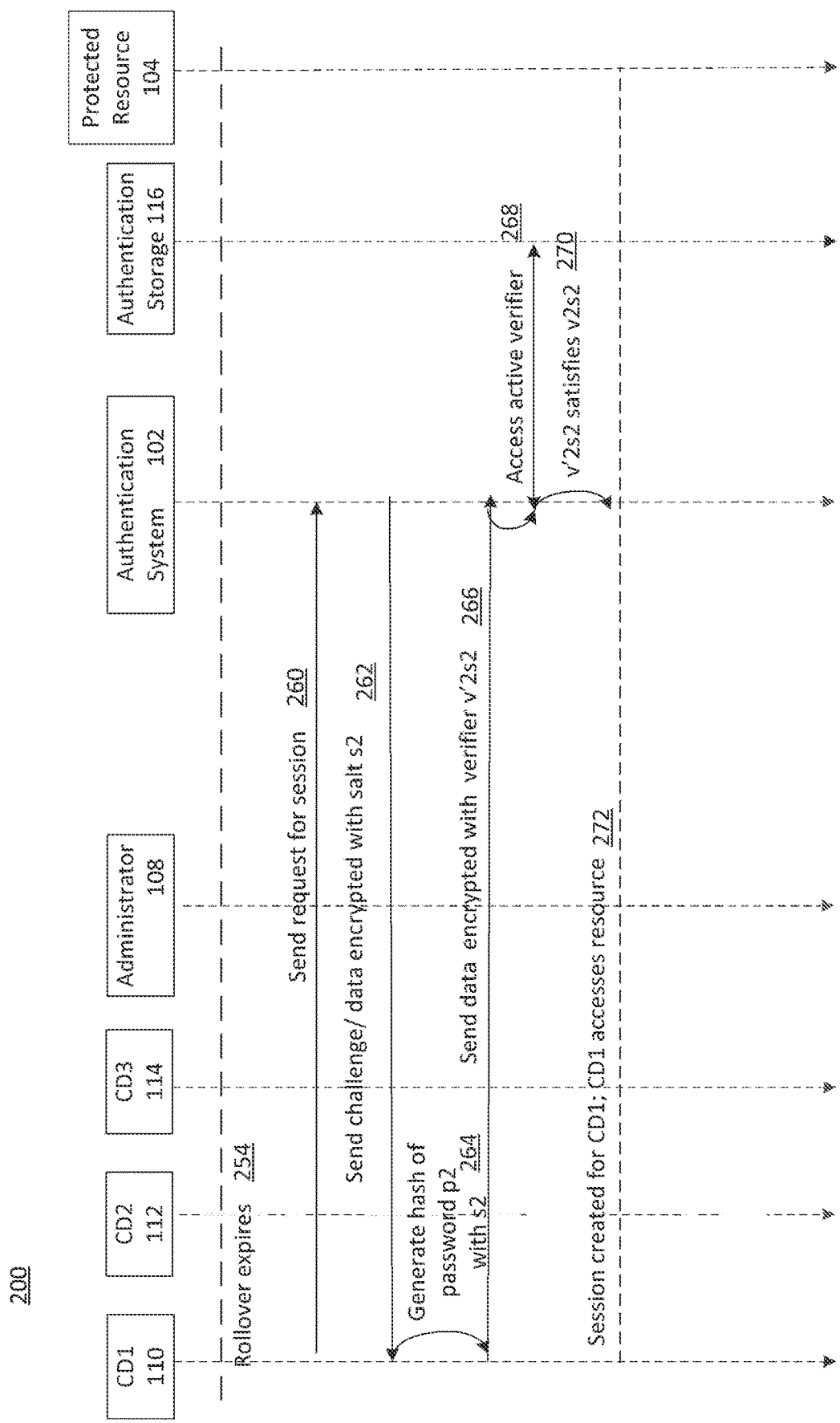

FIGS. 2a, 2b, and 2c are a sequence diagrams illustrating an exemplary password rollover process 200 for gradually transitioning over from a prior password to a replacement password in a distributed environment 100. The processes of FIGS. 2a, 2b, and 2c may be performed in the distributed environment 100 shown in FIG. 1 in order for client devices CD1 100, CD2 112, and CD3 114 to satisfy password base authentication requirements to access protective resource 104.

In FIG. 2a a replacement password is processed. In action 204, prior to receiving a replacement password, the authentication storage 116 has a stored verifier with salt (v1s1) for prior password (p1) that is used by the client devices to obtain access to the protected resource 104. In action 206, administrator device 108, submits a replacement password (p2) to the authentication system 102. In some implementations, the authentication system 102 may use the Universal Character Set for encoding the password. Although FIG. 2a shows the administrator device 108 submitting the replacement password, other sources of the replacement password is possible. For example, the password may be programmatically changed using an automated function. In some implementations, client devices may also include a privilege to change passwords for the account.

In response to receiving the replacement password (p2), in action 208, the authentication server 102 generates two new verifiers for the replacement password (p2). One verifier for the replacement password is temporary and carries over the prior salt (v2s1). The other verifier for the replacement password employs a new salt (v2s2) and is not used until after the rollover period has expired. In action 210, the two new verifiers with salts are provided by authentication server 102 to authentication storage 116.

In some implementations, the authentication system may evaluate the replacement password, e.g. to determine if the replacement password meets one or more password criteria, for acceptance prior to generating and storing the verifiers. For example, the authentication system may access a password history stored on authentication storage 116 and confirm that the replacement password is sufficiently different from the prior password. If the replacement password meets the predefined criteria, the verifiers are stored and if the replacement password fails to meet the criteria, a notification is sent to the administrator device to resubmit a new replacement password for further evaluation.

In action 212, the receipt of the replacement password p2 also triggers a rollover period to initiate. The rollover period starts ticking the moment the password is successfully changed.

The rollover period may be a predefined time period after which the rollover period automatically expires. The time of the rollover period may be defined by the administrator device and stored in an account profile, e.g. dictionary table described below with regards to FIG. 4. In some implementations, the authentication system may permit the rollover period to be set between a minimum time and maximum time, such as between 1 hour and 60 days.

Typically the automatic expiration occurs on the first connection attempt after the password rollover period has ended. In some implementations, the rollover period may be manually expired, e.g. by the administrator device or by a client device enabled to expire the rollover period. In some implementations, the rollover period may expire prior to the predefined time period if an administrator device manually expires a current password, followed by the administrator device changing the password on the next logon.

In FIG. 2b, the password rollover process 200 continues as the rollover period begins (represented as shaded box in FIG. 2b). In action 220, client device CD3 114 sends a request to authentication system 102 for a session to access protected resource 104. At this point in the example process, the client device CD3 114 had not yet received the replacement password from the administrator deice 108. In response to receiving the request, authentication system 102 may retrieve the stored active verifiers (v1s1) and (v2s1) and extract the verifiers created with the prior salt. The authentication system 102 sends a challenge for CD3 114 to prove identity and also sends the prior salt (s1) to client device CD3 114.

In some implementations, the authentication system 102 may use encryption for the challenge message and salt prior to sending to CD3 114. For example, session key fragments may be generated, such as 16 bytes of random data, to use for the message and salt. In some implementations, the encryption may use key length 256, such as Advanced Encryption Standard (AES)-256, or other key length. The authentication system 102 may encrypt the session key fragments for sending the challenge and salt. In some implementations, an iteration count for the number of times the password is hashed may also be sent to the client device CM3 114. The challenge includes a request for CD3 114 to enter a valid password hashed with the salt (s1) provided by authentication system 102.

In response to the challenge, in action 224, CD3 114 generates a hash of prior password (p1) with salt (s1) to create a verifier with the salt (v'1s1). For example, CD3 114 may compute a verifier (v's1) using the entered password and salt (and optionally the iteration count). In some implementations, CD3 114 may decrypt the message from the authentication system, e.g. to recover the session key fragment. In some implementations, the client device may generate another part of a session key, such as 16 bytes of random data, which may be encrypted.

In action 226, the client device CD3 114 sends the verifier and salt to the authentication system, which may include session keys and encryption. For example, the return message from the client device may include session key fragment data, encrypted with verifier using the first salt (v's1).

The authentication system processes the received message for access approval or denial. For example, the authentication system may decrypt and recover the session key fragment and verifier (v's1). In action 228, authentication system 102 may access the stored active verifier (v2s1) and (v1s1) if the active verifiers are not already accessed.

In some implementations, the authentication system may first compare the entered verifier (v'1s1) from CD3 114 to the stored temporary verifier of the replacement password (v2s1). In the example shown in FIG. 2b, the entered verifier fails to satisfy the temporary verifier (v2s1). The authentication system may then compare the entered verifier (v'1s1) to the prior verifier (v1s1) and the comparison is satisfied, in action 230. However, in some implementations, the entered verifier (v'1s1) may be first compared to the prior verifier (v1s1) and if failed, then compared to temporary verifier (v2s1). In action 232, client device CD3 114 is then granted access to protected resource 104 in a created session.

In action 234, the administrator device 108 propagates the replacement password to client device CD3 114, and in action 236 to client device CD2 112. In action 238, client device CD2 112 sends a request to authentication system 102 for a session to access protected resource 104 and in action 240, the authentication system 102 returns a challenge and prior salt (s1). Encryption and session keys may employed as described above with regards to communication between the authentication system and CD3 114. The prior salt (s1) is provided during the duration of the rollover period. In response to the challenge, in action 242, CD2 112 generates a hash of the replacement password (p2) with salt (s1) to create a new verifier with the prior salt (v'2s1).

In action 244, CD2 112 sends the generated new verifier with prior salt (v'2s1) to the authentication system 102, which may include encryption and session keys as described above with regards to communication between the authentication system and CD3 114. In action 246, authentication system 102 accesses the stored active verifier (v2s1) and (v1s1). The authentication system compares the entered verifier (v'2s1) from CD2 112 to the stored temporary verifier of the replacement password (v2s1), as verification criteria. The comparison is satisfied if the verifier coming from the client is the same as the active stored verifier, in action 248. In this manner the verifier is a shared secret between the client devices, administrator device and the authentication system. In action 250, client device CD2 112 is then granted access to protected resource 104 in a created session.

In action 252, the administrator device 108 propagates the replacement password to client device CD1 110. The rollover period expires in action 254. At the expiration of the rollover period, the temporary verifier (v2s1) and prior verifier (v1s1) are removed from the store of currently available verifiers. In some implementations, the removal of (v2s1) and (v1s1) occur at the action of a next logon by a client device after the rollover period expires. In this manner, client device actions and status triggers maintenance to clean up and removal of obsolete verifiers in the storage.

The rollover period often expires at the end of the designated rollover period of time. In some implementations, the rollover period may be manually expired in response to an event. For example, the administrator device may override the rollover period after it completes propagation of the replacement password to all of the required client devices. In some implementations, the account may exit the password rollover period by the administrator device expiring a current password using a command, followed by the user changing the password on a next logon.

In some instances, a password (p1) may also be replaced if it is suspected that a current password may be compromised. In such a case, the administrator device may set password rollover period to zero or null before changing password to disable the password rollover period. In another implementation, the rollover period may be manually expired immediately after changing the password to retire (p1). This ensures that a potentially compromised password can no longer be used. The administrator may schedule downtime for database clients still using p1. Statistics gathered by the audit records may provide information to determine which clients still using p1 during the rollover period.

In FIG. 2c, the password rollover process 200 continues as the rollover period has ended in action 254. In action 260, client device CD1 110 sends a request to authentication system 102 for a session to access protected resource 104 and in action 262, the authentication system 102 returns a challenge and new salt (s2). Encryption and session keys may employed as described above with regards to FIG. 2b and communication between the authentication system and CD3 114. The new salt (s2) is provided after the rollover period has expired. In response to the challenge, in action 264, CD1 110 generates a hash of the replacement password (p2) with new salt (s2) to create a new verifier with the new salt (v'2s2).

In action 266, CD1 110 sends the generated new verifier with new salt (v'2s2) to the authentication system 102, which may include encryption and session keys as described above with regards to FIG. 2b and communication between the authentication system and CD3 114. In action 268, authentication system 102 accesses the stored active verifier (v2s2). The authentication system compares the entered verifier (v'2s2) from CD1 110 to the stored new verifier of the replacement password (v2s2), as verification criteria. In action 270, the comparison is satisfied and authentication succeeds. In action 272, client device CD1 110 is granted access to protected resource 104 in a created session.

Figure 3:
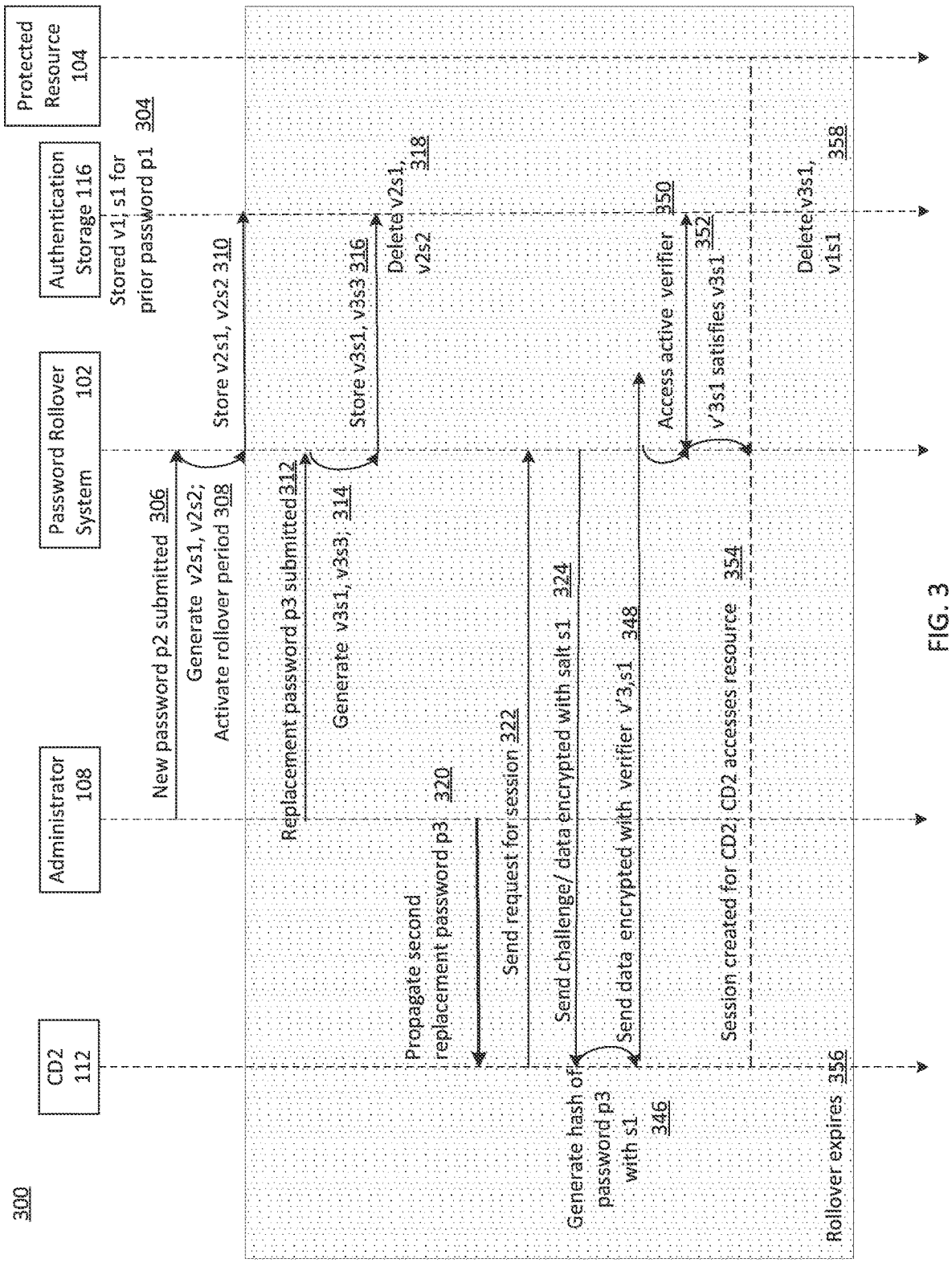
FIG. 3 is a sequence diagram illustrating processes for password rollover in which a password is changed during a rollover period, in accordance with some implementations.

In some implementations, the rollover system addresses multiple sequential passwords submitted by an administrator. FIG. 3, a sequence diagrams illustrating one such situation of an exemplary multiple password rollover process 300 for gradually transitioning over from a prior password to a subsequent, e.g. second, replacement password in a distributed environment 100. The process of FIG. 3 may be performed in the distributed environment 100 shown in FIG. 1 in order for client device CD2 112 to satisfy password base authentication requirements to access protective resource 104.

Subsequent password changes during a rollover period may be requested to address various authentication issues. For example, if it is suspected that the first replacement (or intermediate) password (p2) has been compromised or if the changed password had a typo. If the first replacement password had been already propagated to one or more client devices prior to submitting the second replacement password (p3), there the rollover process may require downtime for client devices to which the second password had already been propagated. Statistics gathered by audit records in the authentication storage may provide information to determine which clients already started using (p2).

Authentication storage initially retains verifier (v1s1) for a prior password (p1), in action 304. The multiple password rollover process 300 begins in a manner similar to the process described with regard to FIG. 2a. In action 306, administrator device 108, submits a replacement password (p2) to the authentication system 102. The submitted replacement password triggers generation of two new verifiers for the replacement password (p2) in action 308: temporary verifier for the replacement password and the prior salt (v2s1), and the verifier for the replacement password with a new salt (v2s2). In action 310, the two new verifiers with salts are provided by authentication server 102 to authentication storage 116. Also in action 308, the rollover period is activated.

According to the example in FIG. 3, while the rollover period is still active, the administrator device 108 submits a second replacement password in action 312. With the receipt of a second or subsequent replacement password, the multiple password process 300 takes a detour from the password rollover process 200 of FIGS. 2a-2c. The effect of the multiple password process 300 is to behave as if the password changed directly from the prior first password (p1) to the second replacement password (p3). In a use case example, the first replacement password may have been mistyped by the administrative user. The second replacement password maybe submitted to correct the error. In some implementations, the authentication system may determine whether the second replacement password is different from the prior first password and the first replacement password, and if different, proceeds with the second replacement password.

In response to receiving the second replacement password (p3), in action 314, the authentication server 102 generates two new verifiers for the replacement password (p3): a temporary verifier for the third password (p3) with the prior salt (v3s1), and a post rollover period verifier for the third password (p3) with a second new salt (v3s3). In action 316 these new verifiers are saved in authentication storage 116.

In action 316, the two new verifiers (v3s3) (v3s1) are provided by authentication server 102 to authentication storage 116 for storage. In action 318, the verifiers for the intermediate replacement password (v2s1) and (v2s2) are deleted from storage. The submission of subsequent replacement passwords after the initial replacement password had been submitted does not alter the time of the rollover period. Thus, the rollover period triggered by the initial replacement password (p2) remains in effect rather than starting the period over or adding to the rollover period time. By fixing the rollover time, an administrator device is foreclosed from changing the password just before the rollover period expires to gain more time in the rollover period and essentially continue using the old password to potentially indefinitely extend the rollover time and the old password beyond the designated rollover period. For example, with the present multiple password rollover process 300, where a rollover period is set to 5 days and a subsequent replacement password is submitted after 1 day into the rollover period, 4 more days remain in the rollover period, rather than extending the rollover period for an additional 5 day period.

The administrator propagates the second replacement password (p3) to client device CD2 112 in action 320. The client device CD2 112 sends a request to begin a session to access the protected resource 104 in action 322. In response, the authentication system 102 issues a challenge and sends the prior salt (s1) to the client device CD2 112 in action 324. Encryption and session keys may employed as described above with regards to FIG. 2b and communication between the authentication system and CD3 114. In action 346, the client device CD2 112 generates a hash of password (p3) with salt (s1). In action 348 sends the resulting verifier (v'3s1) to the authentication system 102, which may include encryption and session keys as described above with regards to FIG. 2b and communication between the authentication system and CD3 114. Upon receipt of the challenge result, the authentication system 102 accesses the stored currently applicable verifiers in action 350. The authentication system 102 compares the entered verifier (v'3s1) from client device CD2 112 with the stored active verifier (v3s1), as verification criteria, to determine that the sent verifier from the entered password (p3) satisfies the active verifier in action 352. Had the client device CD2 112 entered the prior password (p1) via verifier (v1s1) with the prior salt (also referred to as v1s1) instead of the verifier for the second replacement password (p3), the client device would have still been approved to access the protected resource.

In action 354, client device CD2 112 is permitted access to the protected resource and a session is created. When the rollover period expires in action 356, the verifiers that include the prior salt (v3s1) and (v1s1) are deleted from the authentication storage, in action 358.

The multiple password process 300 may be repeated for subsequent password changes during the rollover period. However, the last password change time recorded to mark the beginning of the password rollover period is not changed with the subsequent replacement passwords while the rollover period is ongoing.

Methods described herein, e.g. FIGS. 2a, 2b, 2c and FIG. 3, can be implemented by computer program instructions or code, which can be executed on a computer. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system).

Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (GPUs), Application Specific Integrated Circuits (ASICs), and the like. One or more methods can be performed as part of or component of an application running on the system, or as an application or software running in conjunction with other applications and an operating system.

FIG. 4 illustrates and example of an account dictionary table 400 that organizes and stores various authentication data in the authentication storage, such as in 116 of FIG. 1. The account dictionary table 400 may also be referred to as a "user profile" or "account profile". The account dictionary table 400 may be used to store required parameters, current data representing the account, and/or previous authentication data for the account, as shown as Account A, for client devices 402, e.g. CD1, CD2, and CD3. The table data may be periodically updated on a regular schedule or by request. For example, the administrator device requesting specific data views from the table may trigger an update of table data. The table includes columns for data describing active verifier 404, status identifier 406, rollover period value 408, audit event 410, and user context 412.

The active verifier 404 column includes the verifiers currently being used to authorize sessions for the client devices. For example, when a status identifier 404 indicates the account is in a password rollover period, e.g. OPEN & IN ROLLOVER, an active verifier may be a replacement password verifier and prior salt (v2s1) and a prior password verifier and prior salt (v1s1). If a subsequent replacement password had been submitted during the rollover period, the active verifiers may be a second replacement password verifier and prior salt (v3s1), rather than (v2s1).

The status identifier 406 column provide an account status value for the client devices 402. For example, various account status values are available to characterize the status of a client device, as described below in Table 1.

TABLE 1

| ACCOUNT STATUS | DESCRIPTION |
|---|---|
| OPEN & IN ROLLOVER | Account is in rollover period. Client may logon using either the prior (p1) or replacement password (p2). At the time the client device logs in, the authentication system re-calculates whether the client device is still in the rollover period. In case the rollover period has expired, logon will succeed only using the replacement password. |
| EXPIRED & IN ROLLOVER | A replacement password is manually expired via an administrator device command, while the account is in a rollover period. The administrator device may logon using the prior password (p1) or the expired replacement password (p2). Once the password is reset to a second replacement password (p3) and then both p1 and p2 will expire and the account will move to the status "OPEN". |
| LOCKED (TIMED) & IN ROLLOVER | Account is automatically locked by the authentication system, for example if there are too many failed login attempts while the account is in rollover period. The account will remain locked for a predefined lock time. After the lock time ends, the logon behavior will be the same as when the account status is OPEN & IN ROLLOVER. |
| EXPIRED & LOCKED (TIMED) & IN ROLLOVER | Account is automatically locked by the authentication system, for example if there are too many failed login attempts while the account is in the rollover period. The password is also manually expired by command. After the lock time ends, the logon behavior will be the same as when the account status is EXPIRED & IN ROLLOVER. |
| LOCKED & IN ROLLOVER | Account is manually locked, e.g. by authentication device command, while the account is in the rollover period. After the account is manually unlocked, the logon behavior will be the same as when the account status is OPEN & IN ROLLOVER. |
| EXPIRED & LOCKED & IN ROLLOVER | Account in the rollover period is subsequently manually locked by command and the password is also manually expired by command. The account may be manually unlocked. The logon behavior will be the same as when the account status is EXPIRED & IN ROLLOVER. |

The rollover period value 408 column provides for a predefined amount of time for the rollover period. The value may be established by the administrator device as a profile item in the table prior to the administrator device submitting a replacement password. When the password rollover feature is enabled for an account, the rollover period value is a non-zero value. In some implementations, a client device may be permitted to alter the rollover period value 408. In some implementations, the rollover period value 408 may be preset by the authentication system and may not be altered by the administrator device.

In some implementations a minimum and/or maximum rollover period value may be designated and stored in the account dictionary table. For example, an administrator device may be prohibited from setting the rollover period value to be less than a minimum time and/or greater than a maximum time.

In some implementations the rollover period may be altered while a rollover period is occurring. For example, during the rollover period, an administrator device may send an extension request to the authentication server to extend the rollover period by a particular amount of time. In response to receiving the extension request, the rollover period value 108 may be changed to the specified period of in the extension request, e.g. by adding an additional time onto the rollover period value.

The audit event 410 column captures audit event data for sessions established during a password rollover period. In some implementations, the recording of auditing data may be enabled or disabled by the administrative user. The audit event 410 column includes the password verifier that was used to authenticate a client during a rollover period for a given session. For example, the audit event 410 column may values of "OLD" to indicate a prior verifier and prior salt was used or "NEW" to indicate a new verifier and old salt for a replacement password was used. Other values may be employed to indicate what verifier was used in a session. If various verifiers are possible, the audit event 410 column may also specify which version was used by a client for the particular session. In some implementations, the audit event 410 column may also specify capabilities that are supported by the client, e.g. abilities to perform particular authentication protocols using specific password versions, ability to generate a session key encrypted for particular updates, etc.

In some implementations, the authentication data listed in the account dictionary table 400 may be aggregated and presented in various views for a user. For example, a view of audit event data may display a time series of count of connections using old and new passwords per user, per IP address, per application employed by each client device, per time period, e.g. day or hour, etc.

In some implementations, the administrator device may use the audit event data to view the password being entered by the client devices. The administrator device may confirm that all client devices have received and are using the replacement password. The administrator device may determine that the rollover period should be extended or manually expired based on the activities of the client devices.

The user/client device context 412 may provide user specific-information, such as roles of a user/client device or information regarding an application running on the client device. Such context information may be used in making access control decisions by the authentication system.

In various implementations the authentication storage may maintain any or all of the above described authentication data. Other types of authentication data may also be stored in the account dictionary table 400. For example a password history column may store a history of passwords that have been used for authentication for the given account. In some implementations, the password history data may be used to determine if a submitted replacement password is sufficiently different from prior submitted passwords used for prior authentication for the account. In some implementations, the password history may not maintain an intermediate password in which a replacement password was supplanted by a subsequent replacement password during a rollover period. The password history may maintain the old password and the subsequent replacement password.

In some implementations, the account dictionary table 400 may also store a logon failure count. When the authentication server registers an entered password from a client device is not successful, the failed logon count may be incremented. In some implementations, after a designated number of failed logons the account may be locked.

Figure 5:
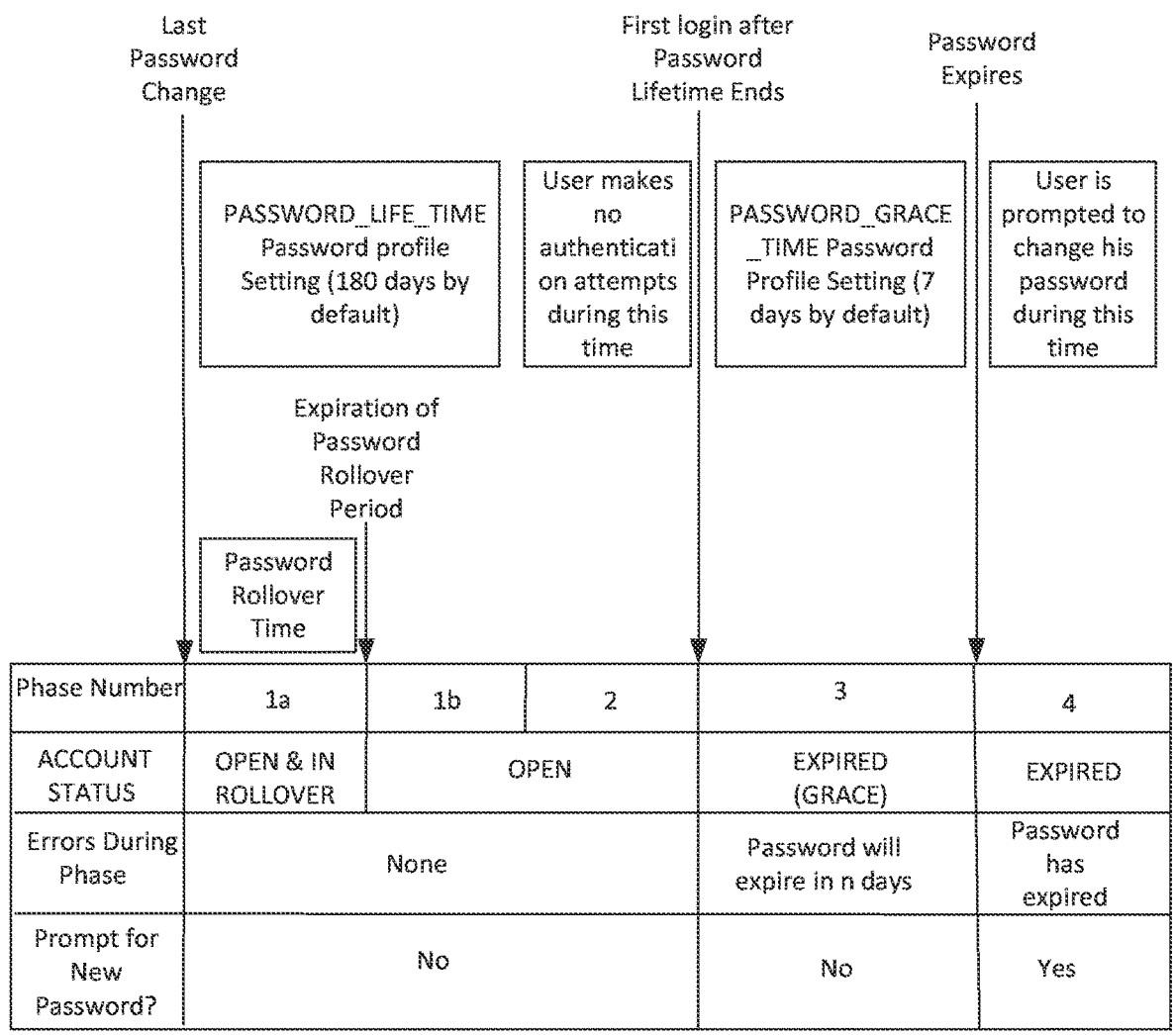
FIG. 5 is a sequence diagram illustrating a password lifecycle, in accordance with some implementations.

FIG. 5 is schematic diagram depicting an exemplary password lifetime. The password rollover period extends the password lifetime beyond the time when the password is changed. In phase 1, the password lifetime begins after the user account is created or when the password has been changed. When the password of an existing account is changed, and the user's profile has a non-zero "PASSWORD_ROLLOVER_TIME" value. In this instance, the password lifetime is composed of two phases, 1a and 1b.

Phase 1a begins with the password change. During phase 1a, a client device can be logged in using either the old password or the new password. The duration of phase 1a is normally "PASSWORD_ROLLOVER_TIME". If the administrator was able to update the password in all client applications, the administrator may end the password rollover prior sooner than the rollover period. For example, the administrator may makes the new password the only one that is accepted by issuing the command, "ALTER USER username EXPIRE PASSWORD ROLLOVER PERIOD."

Phase 1b corresponds to the time remaining after the password rollover period expires. During Phase 1b, a client device may be logged in using only the new password. The password rollover period may be manually ended by executing the statement, "ALTER USER username EXPIRE PASSWORD ROLLOVER PERIOD."

Phase 2 represents the period of time after the password lifetime ends but before the user logs in again with a correct password. In some implementations, the correct credentials may be needed for the system to update the account status. Otherwise, the account status may remain unchanged. The system may not include a background process to update the account status. All changes to the account status may be driven by a server process on behalf of authenticated users.

When the client device logs in, a grace period begins in Phase 3. The grace period provides a time period in which a new password is required to be submitted into the system. The system may update a DBA_USERS.EXPIRY_DATE column to a new value using the current time plus the value of the PASSWORD_GRACE_TIME setting from the account's password profile. At the start of the grace period, the administrative device may receive a warning notification message about the password expiring in the near future. For example, a notification may state, "the password will expire within 7 days if PASSWORD_GRACE_TIME is set to 7 days. During the grace period in Phase 3, a client device can still be logged in without changing the password. The DBA_USERS.EXPIRY_DATE column shows the time in the future when the administrative device may be prompted to change their password.

Following the grace period, in phase 4, the password has expired and an error appears. The administrative device may be prompted to change the password after entering the current, correct password before the authentication can proceed.

In some implementations, the protected resource (such as 104 in FIG. 1) may allow for various levels of access for particular data provided in the protected resource. For example, there may be a primary database and a stand-by database that provides for less access privileges to the data. The authentication attempt may be made on the standby data, which may be a read-only database. The system may provide a client device and/or administrative device with an expiration notification, such as "your password has expired and the database is set to read-only error appears." The user should log into the primary database and change the password there.

Figure 6:
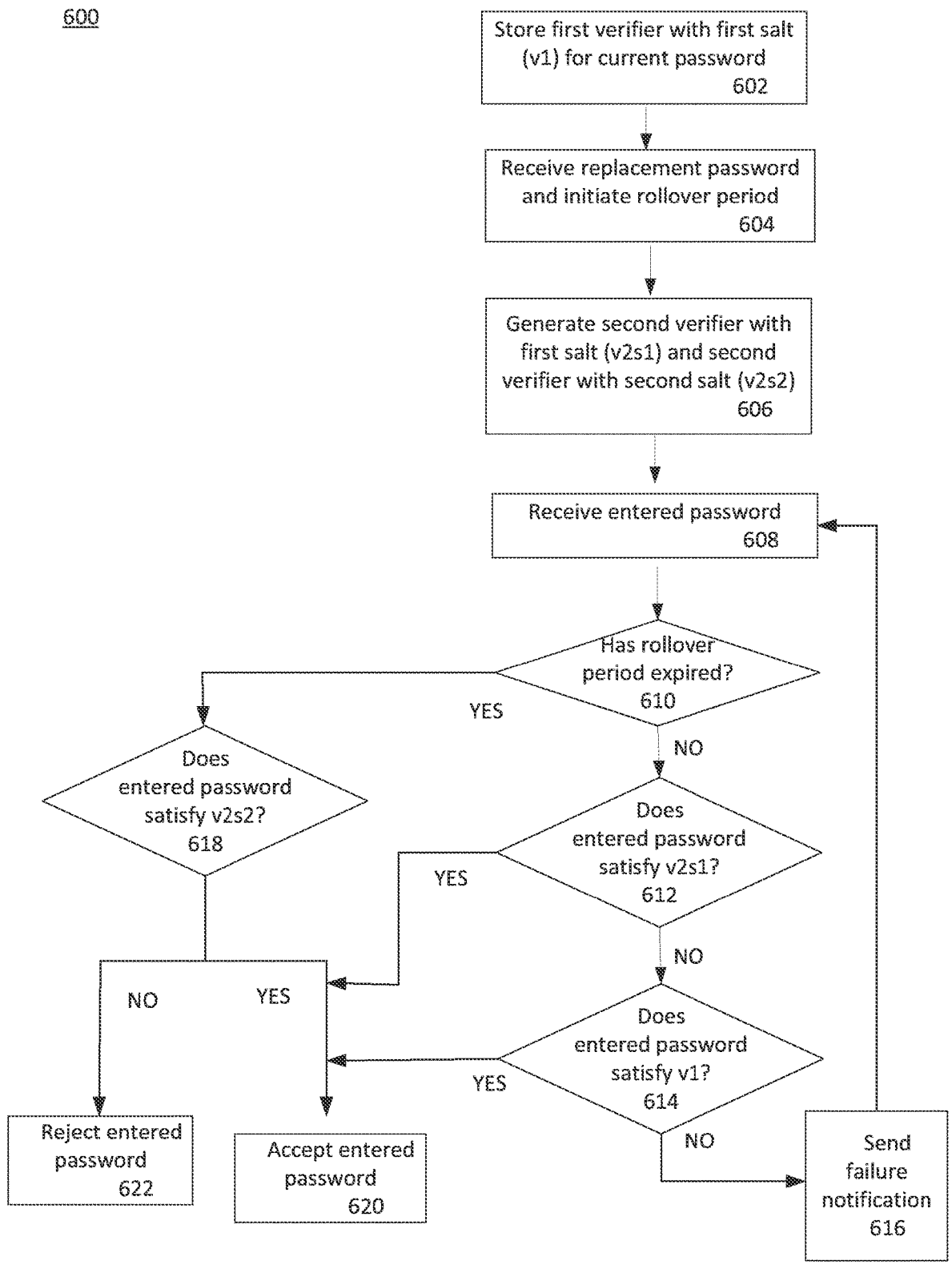
FIG. 6 is a flow diagram of an example method to gradually rollover a password, in accordance with some implementations.

FIG. 6 is a flow diagram of an example password rollover method to gradually rotate a password. In block 602, a first verifier with first salt (v1s1) is stored for a prior password, such as in authentication storage 116 in FIG. 1. In block 604, a replacement password is received and a rollover period is initiated. In block 606, a second verifier with first salt (v2s1) is generated. A second verifier with second salt (v2s2) is also generated. In block 608, an entered password that is entered by a client device is received. In decision block 610, it is determined whether the rollover period has expired. If the rollover period is not expired, it is determined in decision block 612 whether the entered password satisfies a comparison with the stored second verifier with the first salt (v2s1), as verification criteria. If the v2s1 is not satisfied, the process proceeds to decision block 614. It is determined whether the entered password satisfies the stored first verifier with first salt (v1s1), as verification criteria, that was for the prior password. If the verifier for the prior password is not satisfied by the entered password, the process proceeds to block 616 to notify the client device that the entered password has failed. The process returns back to block 608 as the client device enters another password in continued attempt to pass authentication.

If the rollover period has expired in decision block 610, the process proceeds to decision block 618 to determine if the most recently entered password satisfies the second verifier with the second salt (v2s2), as verification criteria. If the (v2s2) is satisfied, the password is accepted in block 620. If not, the entered password is rejected in block 622.

The password rollover method may be performed via software, hardware, and combinations thereof. For example, the process may be carried out in software, such as an authentication protocol running on a server of the rollover system. Although the description has been described with respect to particular embodiments thereof, these particular embodiments are merely illustrative, and not restrictive.

Figure 7:
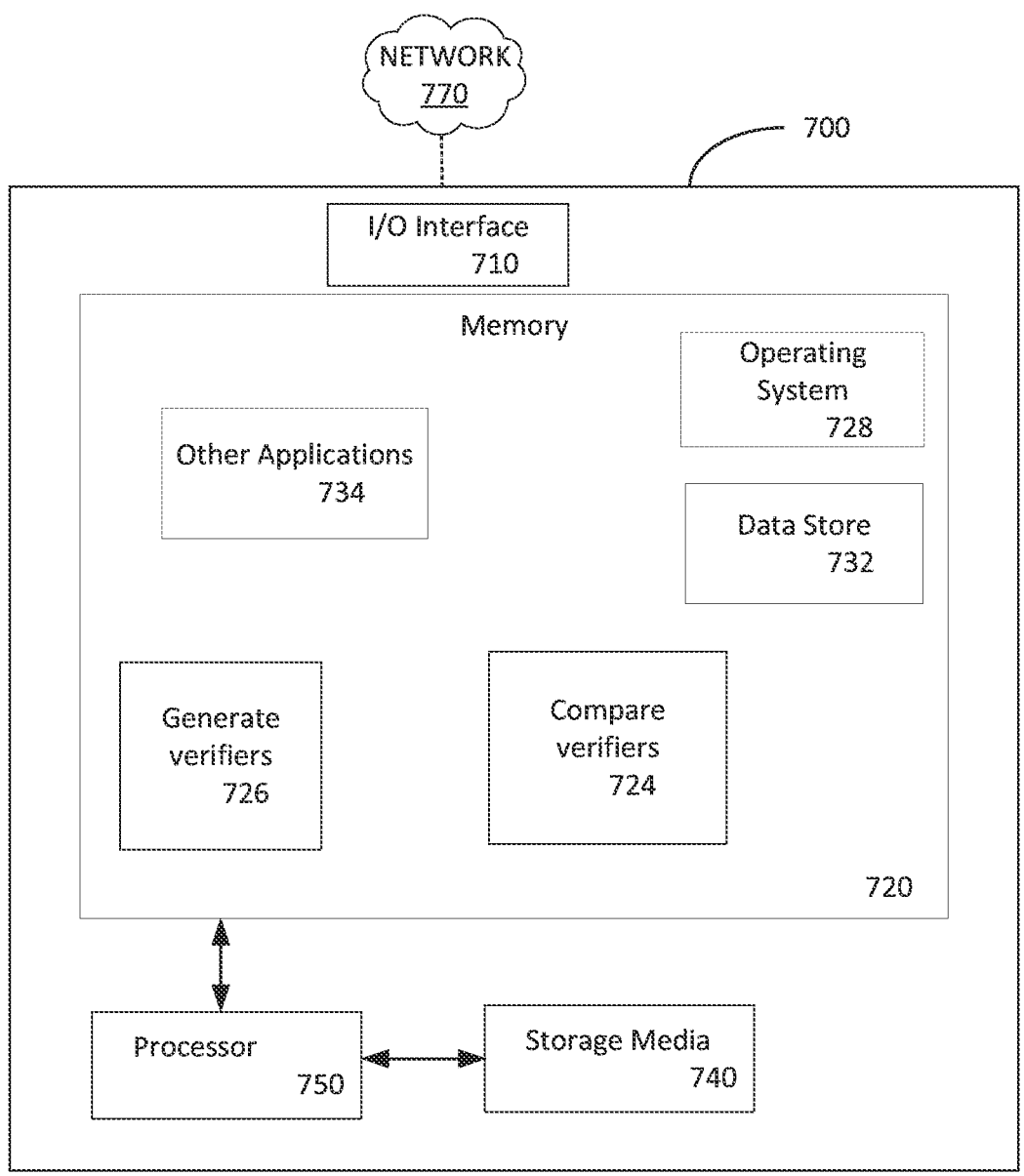
FIG. 7 is a block diagram of a computing device usable to implement in the rollover system of FIGS. 1-3, in accordance with some implementations.

FIG. 7 is a block diagram of a computing device usable to implement in the rollover system of FIGS. 1-3. The computer device 700 may be a server included in the authentication system. Computer device 700 is merely illustrative and not intended to limit the scope of the claims. One of ordinary skill in the art would recognize other variations, modifications, and alternatives.

In one exemplary implementation, computer device 700 includes an I/O interface 710 (which may represent a combination of a variety of communication interfaces) that may include a network interface that, e.g. receives replacement password, receives entered passwords, receives access requests, sends challenges and salts, sends and retrieves data from storage, etc. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like.

Computer device 700 may also include software that enables communications of I/O interface 710 over a network 770 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 770 may include a local area network, a wide area network, a wireless network, an Intranet, the Internet, a private network, a public network, a switched network, or any other suitable communication network, such as for example Cloud networks. Network 770 may include many interconnected computer systems and any suitable communication links such as hardwire links, optical links, satellite or other wireless communications links such as BLUETOOTH, WIFI, wave propagation links, or any other suitable mechanisms for communication of information. For example, network 770 may communicate to one or more mobile wireless devices 956A-N, such as mobile phones, tablets, and the like, via a base station such as a wireless transceiver.

Computer device 700 typically includes familiar computer components such as a processor 750, and memory storage devices, such as a memory 720, e.g., random access memory (RAM), storage media 740. A bus may interconnect computer components. In some implementations, computer device 700 is a server having hard drive(s) (e.g. SCSI) and controller card, server supported processors, network interface, memory, and the like. While a computer is shown, it will be readily apparent to one of ordinary skill in the art that many other hardware and software configurations are suitable for use with the present invention.

Memory 720 and storage media 740 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 732 may be employed to store various on-board data.

One or more computer programs, such as compare verifiers 724 that compares entered verifiers from client devices to stored active verifiers, and generate verifiers 726 that creates new verifiers with prior and new salts in response to receiving replacement passwords, and other applications 734 to enable the authentication system to operate and conduct the password rollover process. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 720, storage device or memory on processor 750. A machine readable medium is any computer program product, apparatus or device used to provide machine instructions or data to a programmable processor.

Computer device 700 further includes operating system 728. Any operating system 728, e.g. server OS, that is supports the fail-over cluster may be employed, e.g. Linux, Windows Server, Mac OS, etc.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus for transitioning passwords of a user account accessible to a plurality of client devices, the apparatus comprising:
   one or more processors; and
   logic encoded in one or more non-transitory media for execution by the one or more processors and when executed operable to perform operations comprising:

activating a rollover period in response to receiving a first replacement password to replace a first password associated with a stored first verifier created with a first salt (v1s1);

in response to receiving the first replacement password, generating a second verifier created with a second salt (v2s2) and a second verifier created with the first salt (v2s1), wherein the first salt is continued from prior use with the first verifier associated with the first password;

during the rollover period, receiving a second replacement password;

removing v2s1 and v2s2 for the first replacement password;

generating a third verifier created with a third salt (v3s3) and a third verifier created with a first salt (v3s1), wherein the first salt is continued from prior use with the first verifier associated with the first password; and authenticating an entered password, by the entered password meeting one verification criteria of:

during the rollover period, the entered password satisfying one of v3s1 or v1s1; or after the rollover period expires, the entered password satisfying v3s3.

2. The apparatus of claim 1, wherein the operations further comprise:

storing in an authentication storage, v3 s3 and v3s1 as active verifiers corresponding to the second replacement password.

3. The apparatus of claim 2, wherein the operations further comprise:

after rollover period expires, removing v1s1 and v3s1 from the authentication storage.

4. The apparatus of claim 1, wherein the second replacement password is received from an administrator device and wherein the rollover period corresponds with a non-zero value in a user profile for the user account.

5. The apparatus of claim 1, wherein the operations further comprise:

overriding the rollover period after an administrator device propagates the second replacement password to the plurality of client devices.

6. The apparatus of claim 1, wherein the operations further comprise: prior to verifying the entered password during the rollover period:

receiving a lock status of the user account, wherein the lock status is continued for a lock period of time; and receiving an unlock status of the user account after the lock period of time, wherein the rollover period is maintained during the lock status and unlock status.

7. The apparatus of claim 1 wherein the operations further comprise:

during the rollover period, extending the rollover period by a particular amount of time in response to receiving an extension request, by changing a profile parameter specifying a time for the rollover period.

8. A computer-implemented method for transitioning passwords of a user account accessible to a plurality of client devices to access a database server, the method comprising:

activating a rollover period in response to receiving a first replacement password to replace a first password associated with a stored first verifier created with a first salt (v1s1);

in response to receiving the first replacement password, generating a second verifier created with a second salt (v2s2) and a second verifier created with the first salt (v2s1), wherein the first salt is continued from prior use with the first verifier associated with the first password;

during the rollover period, receiving a second replacement password;

removing v2s1 and v2s2 for the first replacement password;

generating a third verifier created with a third salt (v3s3) and a third verifier created with a first salt (v3s1), wherein the first salt is continued from prior use with the first verifier associated with the first password; and authenticating an entered password by the entered password meeting one verification criteria of:

during the rollover period, the entered password satisfying one of v3s1 or v1s1; or after the rollover period expires, the entered password satisfying v3s3.

9. The computer-implemented method of claim 8, further comprising:

storing in an authentication storage, v3s3 and v3s1 as active verifiers corresponding to the second replacement password.

10. The computer-implemented method of claim 9, further comprising:

after rollover period expires, removing v1s1 and v3s1 from the authentication storage.

11. The computer-implemented method of claim 8, wherein the second replacement password is received from an administrator device and wherein the rollover period corresponds with a non-zero value in a user profile for the user account.

12. The computer-implemented method of claim 8, further comprising:

overriding the rollover period after an administrator device propagates the second replacement password to the plurality of client devices.

13. The computer-implemented method of claim 8, further comprising: prior to verifying the entered password during the rollover period:

receiving a lock status of the user account, wherein the lock status is continued for a lock period of time; and receiving an unlock status of the user account after the lock period of time, wherein the rollover period is maintained during the lock status and unlock status.

14. The computer-implemented method of claim 8, further comprising:

during the rollover period, extending the rollover period by a particular amount of time in response to receiving an extension request, by changing a profile parameter specifying a time for the rollover period.

15. A non-transitory computer-readable storage medium carrying program instructions thereon for transitioning passwords of a user account accessible to a plurality of client devices, the instructions when executed by one or more processors cause the one or more processors to perform operations comprising:

activating a rollover period in response to receiving a first replacement password to replace a first password associated with a stored first verifier created with a first salt (v1s1);

in response to receiving the first replacement password, generating a second verifier created with a second salt (v2s2) and a second verifier created with the first salt (v2s1), wherein the first salt is continued from prior use with the first verifier associated with the first password;

during the rollover period, receiving a second replacement password;

removing v2s1 and v2s2 for the first replacement password;

generating a third verifier created with a third salt (v3s3) and a third verifier created with a first salt (v3s1), wherein the first salt is continued from prior use with the first verifier associated with the first password; and authenticating an entered password by the entered password meeting one verification criteria of:

during the rollover period, the entered password satisfying v3s1 or v1s1; or after the rollover period expires, the entered password satisfying v3s3.

16. The storage medium of claim 15, wherein the operations further comprise:

storing in an authentication storage, v3s3 and v3s1 as active verifiers corresponding to the second replacement password.

17. The storage medium of claim 16, wherein the operations further comprise:

after rollover period expires, removing v1s1 and v3s1 from the authentication storage.

18. The storage medium of claim 15, wherein the second replacement password is received from an administrator device and wherein the rollover period corresponds with a non-zero value in a user profile for the user account.

19. The storage medium of claim 15, wherein the operations further comprise:

overriding the rollover period after an administrator device propagates the second replacement password to the plurality of client devices.

20. The storage medium of claim 15, wherein the operations further comprise: prior to verifying the entered password during the rollover period:

receiving a lock status of the user account, wherein the lock status is continued for a lock period of time; and receiving an unlock status of the user account after the lock period of time, wherein the rollover period is maintained during the lock status and unlock status.

* * * * *

UNITED STATES PATENT AND TRADEMARK OFFICE
CERTIFICATE OF CORRECTION

PATENT NO. : 11,558,373 B2
APPLICATION NO. : 17/109097
DATED : January 17, 2023
INVENTOR(S) : Chitkara et al.

It is certified that error appears in the above-identified patent and that said Letters Patent is hereby corrected as shown below:

In the Claims

In Column 21, Line 26, in Claim 2, delete "v3 s3" and insert -- v3s3 --, therefor.

Signed and Sealed this
Seventeenth Day of October, 2023

Katherine Kelly Vidal
*Director of the United States Patent and Trademark Office*